United States Patent
Chao et al.

(10) Patent No.: US 7,354,535 B2
(45) Date of Patent: Apr. 8, 2008

(54) METHOD AND APPARATUS FOR ADHERING LIGHT-SHIELDING SHEETS RESPECTIVELY ONTO TRANSPARENT BODIES

(75) Inventors: Sheng-Jui Chao, Taichung (TW); Yi-Long Zhan, Taichung (TW); Hui-Chuan Kuo, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 265 days.

(21) Appl. No.: 11/318,035

(22) Filed: Dec. 23, 2005

(65) Prior Publication Data

US 2006/0186836 A1   Aug. 24, 2006

(30) Foreign Application Priority Data

Feb. 18, 2005   (TW) .............................. 94104814 A

(51) Int. Cl.
*B29D 11/00*   (2006.01)
(52) U.S. Cl. .................. 264/1.1; 425/406; 425/808
(58) Field of Classification Search .............. 359/227, 359/229, 738–740, 900; 264/1.1, 1.7; 425/406, 425/808
See application file for complete search history.

(56) References Cited

U.S. PATENT DOCUMENTS 4,985,186 A * 1/1991 Nose et al. ................. 264/1.7
4,989,960 A * 2/1991 Thomas ...................... 359/738

* cited by examiner

*Primary Examiner*—Alessandro Amari
(74) *Attorney, Agent, or Firm*—DLA Piper US LLP

(57) ABSTRACT

An apparatus includes a machine bed, a holder unit disposed movably on the machine bed, and an adhesion unit. A method for adhering a light-shielding sheet onto a transparent body includes:
(A) moving the transparent body on a machine bed into a holder unit by suction;
(B) moving the holder unit on the machine bed in a feeding direction;
(C) cooperating with operation of the holder unit so as to apply glue to the transparent body;
(D) cooperating with operation of the holder unit so as to move the transparent body on the machine bed to a position under the light-shielding sheet; and
(E) pressing the light-shielding sheet against the transparent body so as to adhere the light-shielding sheet onto the transparent body, thereby forming an optical lens unit.

13 Claims, 15 Drawing Sheets

METHOD AND APPARATUS FOR ADHERING LIGHT-SHIELDING SHEETS RESPECTIVELY ONTO TRANSPARENT BODIES

CROSS-REFERENCE TO RELATED APPLICATION

This application claims priority of Taiwanese Application No. 094104814, filed on Feb. 18, 2005.

BACKGROUND OF THE INVENTION

1. Field of the Invention

This invention relates to an optical lens unit, and more particularly to method and apparatus for adhering light-shielding sheets onto transparent bodies.

2. Description of the Related Art

Referring to FIG. 1, in a conventional optical instrument, a light-shielding sheet 2 is disposed between two lenses 1 so as to shield the light outside an effective light-transmissive region of the lens 1.

The light-shielding sheets 2 are made by punching, and have a minimal thickness and a small surface area. The light-shielding sheets 2 are blown one at a time into a net bag (not shown) by a fan (not shown). After a predetermined number of the light-shielding sheets 2 have been collected within the net bag, the net bag is moved to another place for assembly with the lenses 1. During assembly, the light-shielding sheets 2 are individually removed from the net bag, and are put into a lens barrel 3 one at a time.

Some problems are encountered during assembly of aforesaid conventional optical instrument. For example, it is difficult to perform stocktaking and material management of the light-shielding sheets 2, and the light-shielding sheets 2 may be misplaced. Since the light-shielding sheets 2 are lightweight and thin, they are difficult to move using a suction-type apparatus. Conveying is also made difficult by the fact that static electricity is produced on the light-shielding sheets 2 during assembly. Furthermore, since the light-shielding sheets 2 are moved manually or by a suction device, fingerprints or traces of the suction device are formed on surfaces of the light-shielding sheets 2, thereby adversely affecting the light-shielding effect of the light-shielding sheets 2.

SUMMARY OF THE INVENTION

An object of this invention is to provide a method for adhering a light-shielding sheet onto a transparent body under automatic control.

Another object of this invention is to provide an apparatus for adhering respectively and individually a plurality of light-shielding sheets onto a plurality of transparent bodies, in which the light-shielding sheets form integral portions of a band.

According to an aspect of this invention, a method for adhering a light-shielding sheet onto a transparent body comprises the steps of:

(A) moving the transparent body on a machine bed into a holder unit by suction;

(B) moving the holder unit on the machine bed in a feeding direction;

(C) cooperating with operation of the holder unit so as to apply glue to the transparent body;

(D) cooperating with operation of the holder unit so as to move the transparent body on the machine bed to a position under the light-shielding sheet; and (E) pressing the light-shielding sheet against the transparent body so as to adhere the light-shielding sheet onto the transparent body, thereby forming an optical lens unit.

According to another aspect of this invention, there is provided an apparatus for adhering respectively a plurality of light-shielding sheets of a band onto a plurality of transparent bodies. The band further has a connecting unit connected integrally to the light-shielding sheets such that the light-shielding sheets are arranged along a longitudinal direction of the band. The apparatus comprises:

an adhesion unit including
 a base,
 a supporting unit disposed on the base,
 an ultraviolet-irradiating unit disposed on the base and adapted to irradiate the transparent bodies individually with ultraviolet light so as to cure an ultraviolet glue applied on the transparent body,
 a movable unit disposed directly above the supporting unit and movable toward and away from the supporting unit, the moving unit including a positioning unit adapted to be moved to engage the band so as to position one of the light-shielding sheets relative to the supporting unit, a pressing unit adapted to be moved to press the one of the light-shielding sheets against a corresponding one of the transparent bodies so as to adhere the one of the light-shielding sheets onto the corresponding one of the transparent bodies to thereby form an optical lens unit, and a cutting unit adapted to be moved to cut the band so as to remove the one of the light-shielding sheets from the remaining portion of the band, and
 a driving unit for moving the movable unit relative to the supporting unit; and a plurality of holders, each of which is adapted to receive one of the transparent bodies and is movable onto the supporting unit of the adhesion unit.

As such, the light-shielding sheets may be automatically adhered to the transparent bodies. This enhances the quality of the optical lens units, and increases the rate of which the light-shielding sheets are adhered to the transparent bodies.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 2:
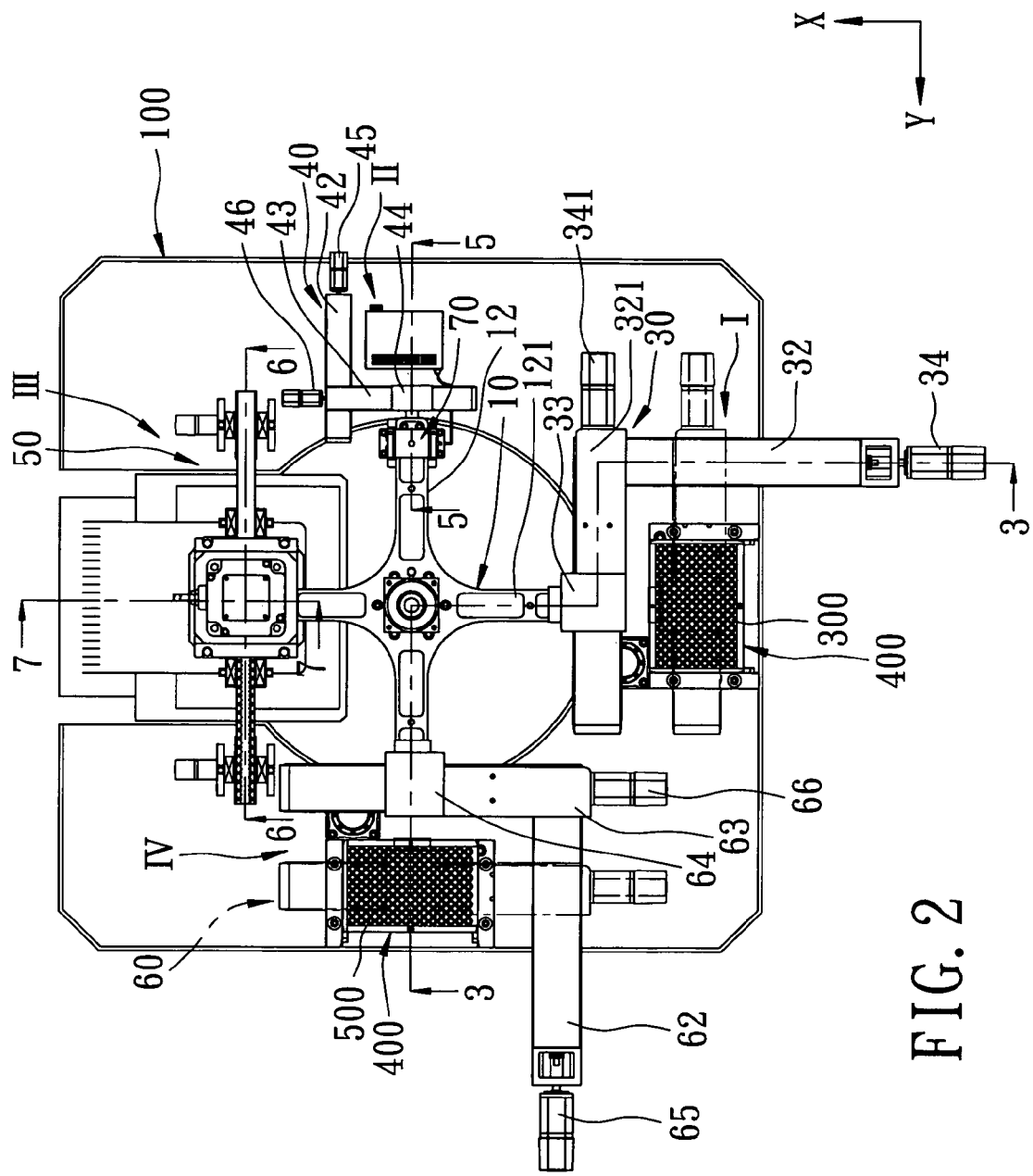
FIG. 2 is a schematic top view of the preferred embodiment of an apparatus for adhering respectively a plurality of light-shielding sheets of a band onto a plurality of transparent bodies according to this invention.
Figure 3:
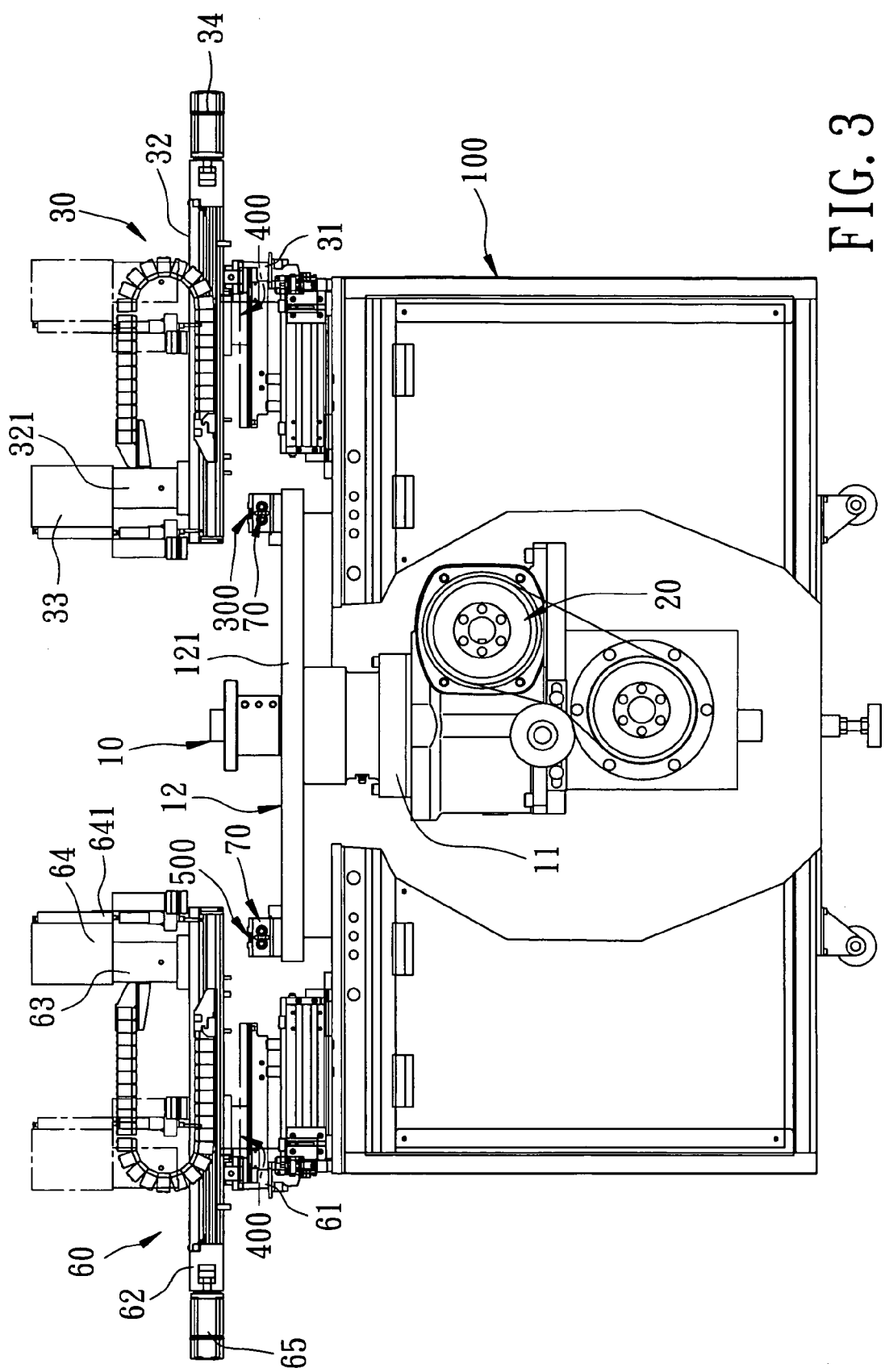
FIG. 3 is a sectional view taken along line 3-3 in FIG. 2.
Figure 10:
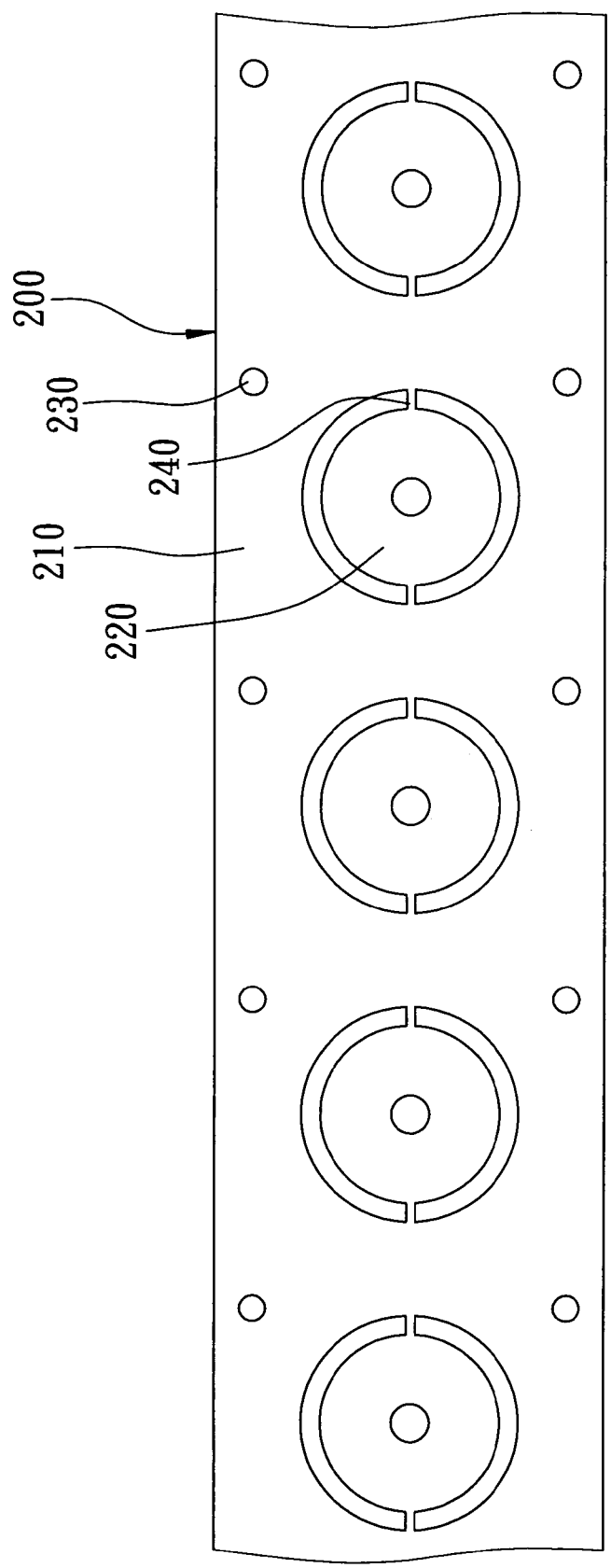
FIG. 10 is a schematic fragmentary top view of the band processed by the apparatus.

Referring to FIGS. 2, 3, and 10, the preferred embodiment of an apparatus for adhering respectively a plurality of light-shielding sheets 220 of a unitary band 200 onto a plurality of transparent bodies 300 according to this invention includes a machine bed 100, a rotating unit 10, a cam unit 20 for driving the rotating unit 10, a suction unit 30, a glue-applying unit 40, an adhesion unit 50, a removing unit 60, and a holder unit consisting of four equidistant holders 70. The units 10, 20, 30, 40, 50, 60 are disposed on the machine bed 100. The rotating unit 10 is disposed between the suction unit 30 and the adhesion unit 50 and between the glue-applying unit 40 and the removing unit 60. The holders 70 are disposed on the rotating unit 10.

Figure 9:
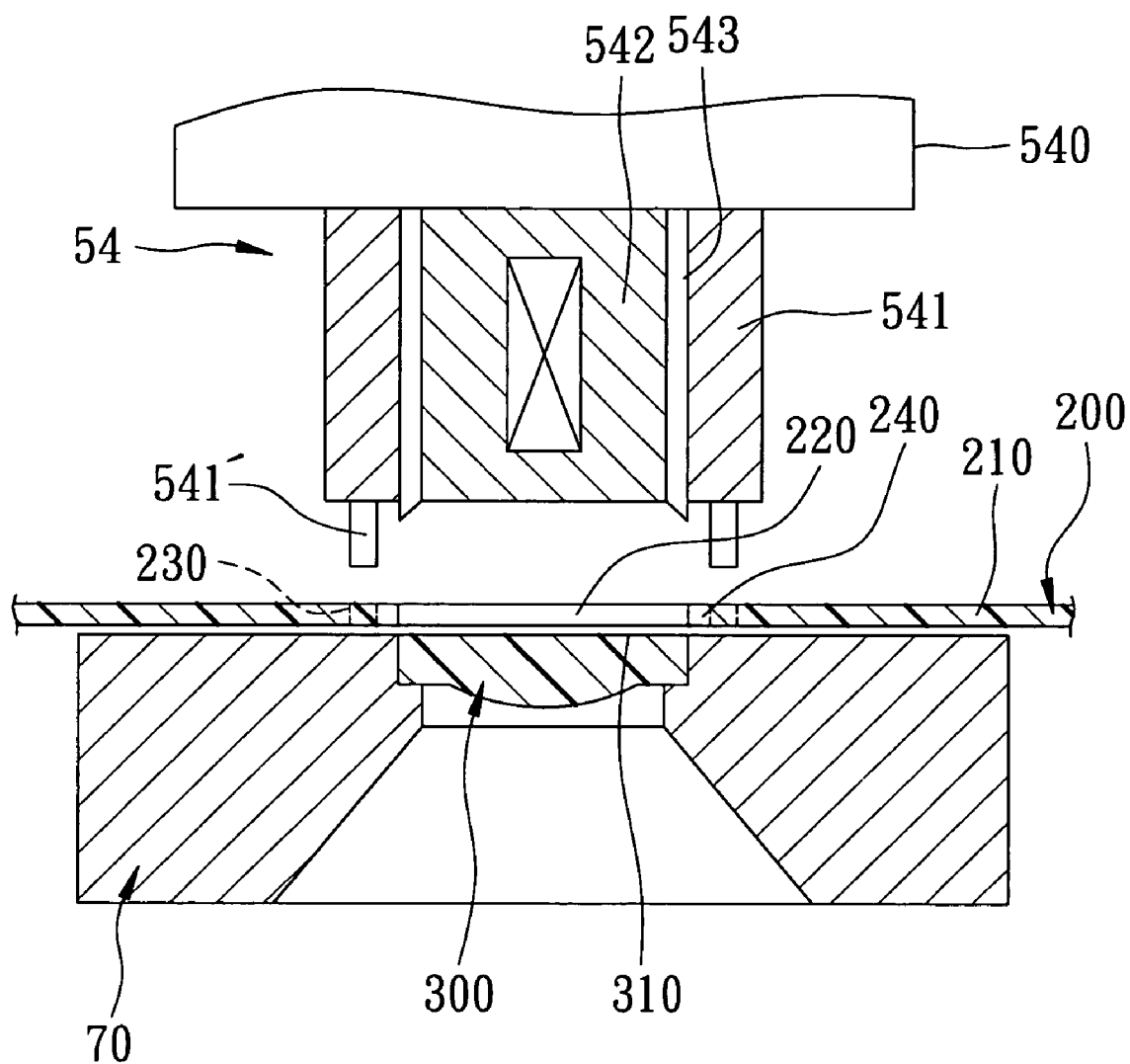
FIG. 9 is a schematic fragmentary sectional view of an adhesion unit of the preferred embodiment.

The band 200 has a connecting unit 210 that is connected integrally to the light-shielding sheets 220 such that the light-shielding sheets 220 are arranged along a longitudinal direction of the band 200. The connecting unit 210 is formed with a plurality of positioning holes 230, and a plurality of sheet-connecting strips 240 for connection with the light-shielding sheets 220. The light-shielding sheets 220 are configured as rings. The transparent bodies 300 are optical lenses, and are made of a plastic material. As best shown in FIG. 9, each of the transparent bodies 300 has a surface 310. The transparent bodies 300 are received within a receiving tray 400 such that the surfaces 310 face upwardly.

The rotating unit 10 includes a bottom seat 11 movable vertically within the machine bed 100, and a cross-shaped rotating member 12 rotatable intermittently on the bottom seat 11 about a vertical axis in a feeding direction (counterclockwise). The rotating member 12 has four angularly equidistant support arms 121, and stops for a predetermined time period after each 90° rotation. The holders 70 are disposed respectively and fixedly on radial outer ends of the support arms 121.

Figure 4:
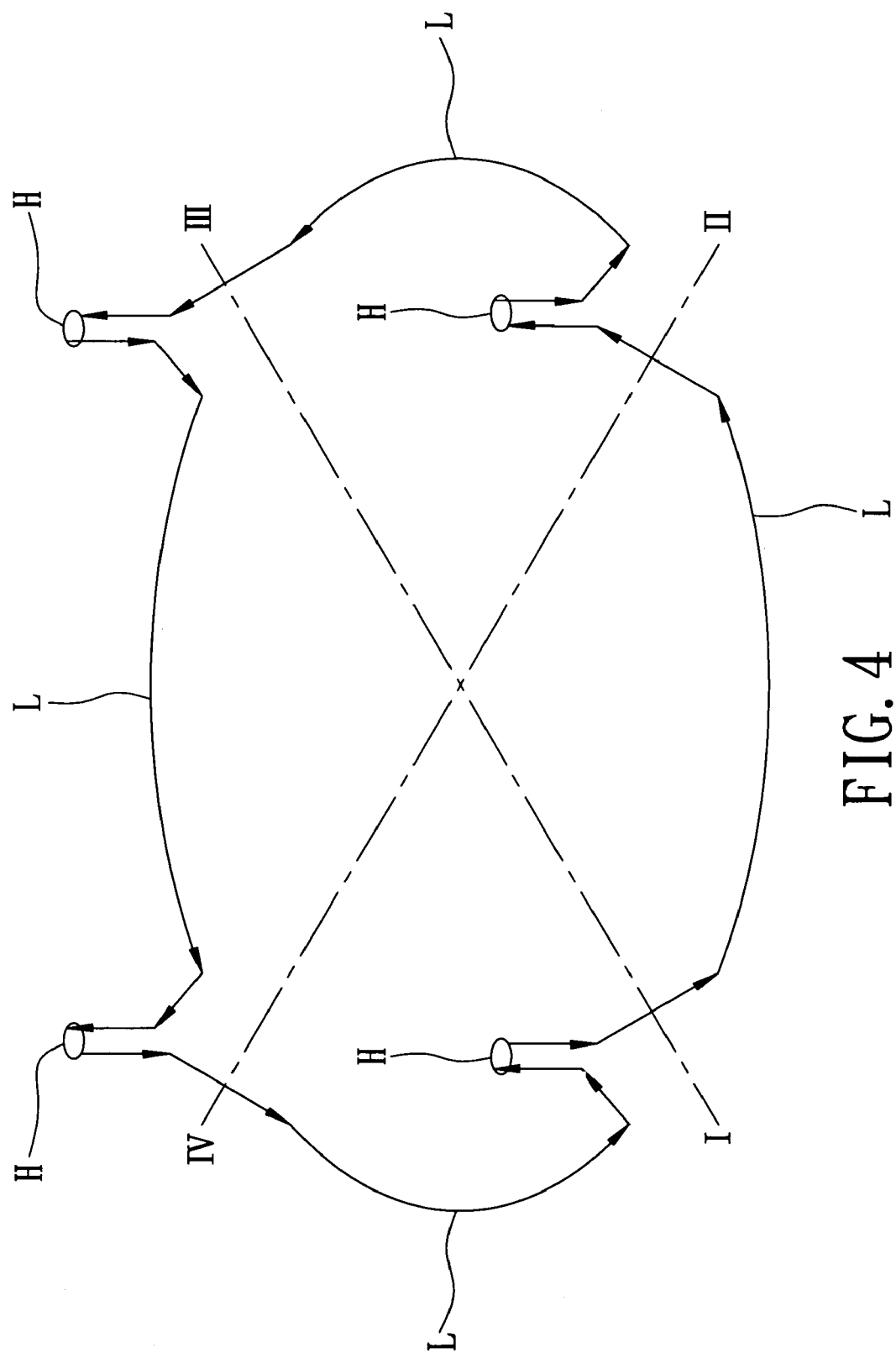
FIG. 4 is a schematic view illustrating intermittent rotation and intermittent vertical reciprocal movement of a rotating member of the preferred embodiment.

With additional reference to FIG. 4, the cam unit 20 drives the rotating member 12 to move vertically between a high position (H) and a low position (L) during each rotation interval of the rotating member 12.

The suction unit 30 is disposed at a first workstation (I), and includes a first fixed seat 31, a horizontal first guide rail 32, a horizontal second guide rail 321, a first supporting member 33, a first driving member 34, and a second driving member 341. The first fixed seat 31 is fixed on a top surface of the machine bed 100. The first guide rail 32 is disposed fixedly on the first fixed seat 31, and extends along a first direction (X) (see FIG. 2). The second guide rail 321 is disposed movably on the first guide rail 32, and extends along a second direction (Y) perpendicular to the first direction (X). The first supporting member 33 is disposed movably on the second guide rail 321. The first driving member 34 is operable to move the second guide rail 321 along the first guide rail 32. The second driving member 341 is operable to move the first supporting member 33 along the second guide rail 321.

Figure 8:
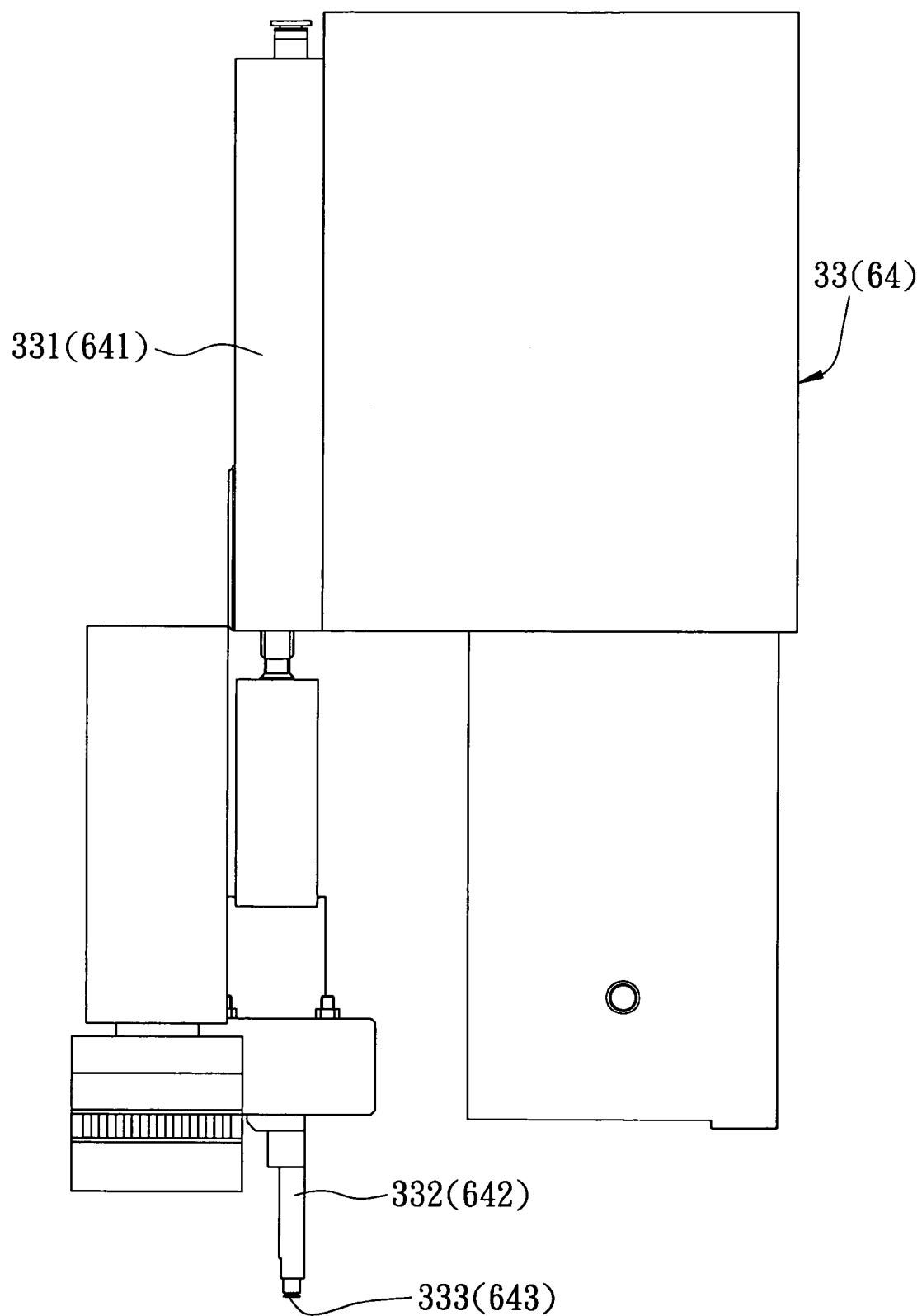
FIG. 8 is a schematic view of a suction unit of the preferred embodiment.

With additional reference to FIG. 8, the suction unit 30 further includes a first driving cylinder 331, a first operating rod 332, and a first suction nozzle 333. The first operating rod 332 is driven by the first driving cylinder 331 to move vertically relative to the first supporting member 33. The first suction nozzle 333 is disposed on a lower end of the first operating rod 332, and is adapted to move one of the transparent bodies 300 into the corresponding holder 70.

Figure 5:
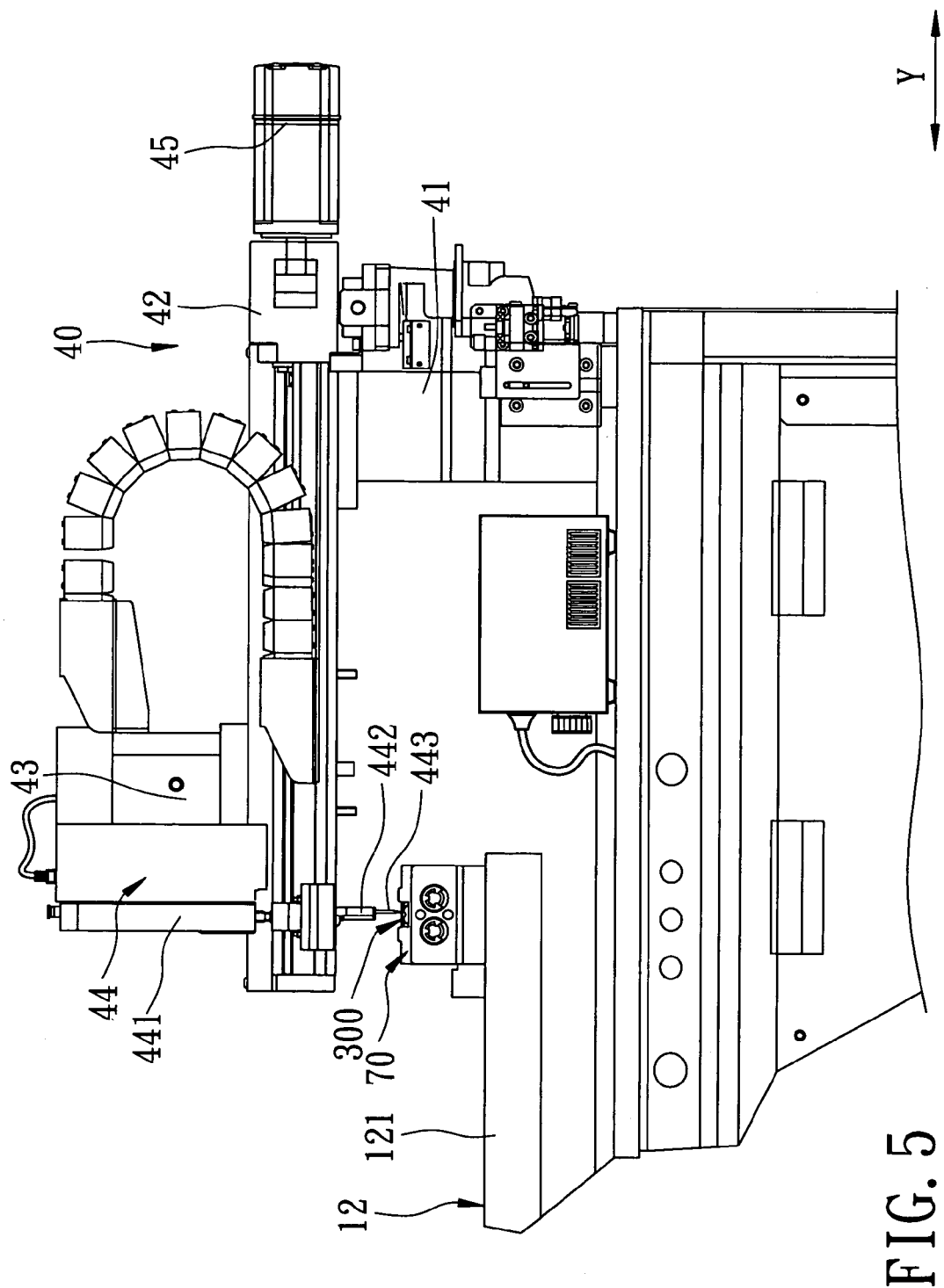
FIG. 5 is a sectional view taken along line 5-5 in FIG. 2.

Referring to FIG. 5, the glue-applying unit 40 is disposed at a second workstation (II) that is located behind the first workstation (I) along the feeding direction, and has a structure similar to the suction unit 30, as shown in FIG. 2. The glue-applying unit 40 includes a second fixed seat 41, a horizontal third guide rail 42, a horizontal fourth guide rail 43, a second supporting member 44, a third driving member 45, and a fourth driving member 46. The second fixed seat 41 is fixed on the top surface of the machine bed 100. The third guide rail 42 is disposed fixedly on the second fixed seat 41, and extends along the second direction (Y) (see FIG. 2). The fourth guide rail 43 is disposed movably on the third guide rail 42, and extends along the first direction (X). The second supporting member 44 is disposed movably on the fourth guide rail 43. The third driving member 45 is operable to move the fourth guide rail 43 along the third guide rail 42. The fourth driving member 46 is operable to move the second supporting member 44 along the fourth guide rail 43. The glue-applying unit 40 further includes a second driving cylinder 441, a second operating rod 442, and a glue-applying member 443. The second operating rod 442 is driven by the second driving cylinder 441 to move vertically relative to the second supporting member 44. The glue-applying member 443 is disposed on a lower end of the second operating rod 432, and is adapted to apply ultraviolet glue to one of the transparent bodies 300.

Figure 6:
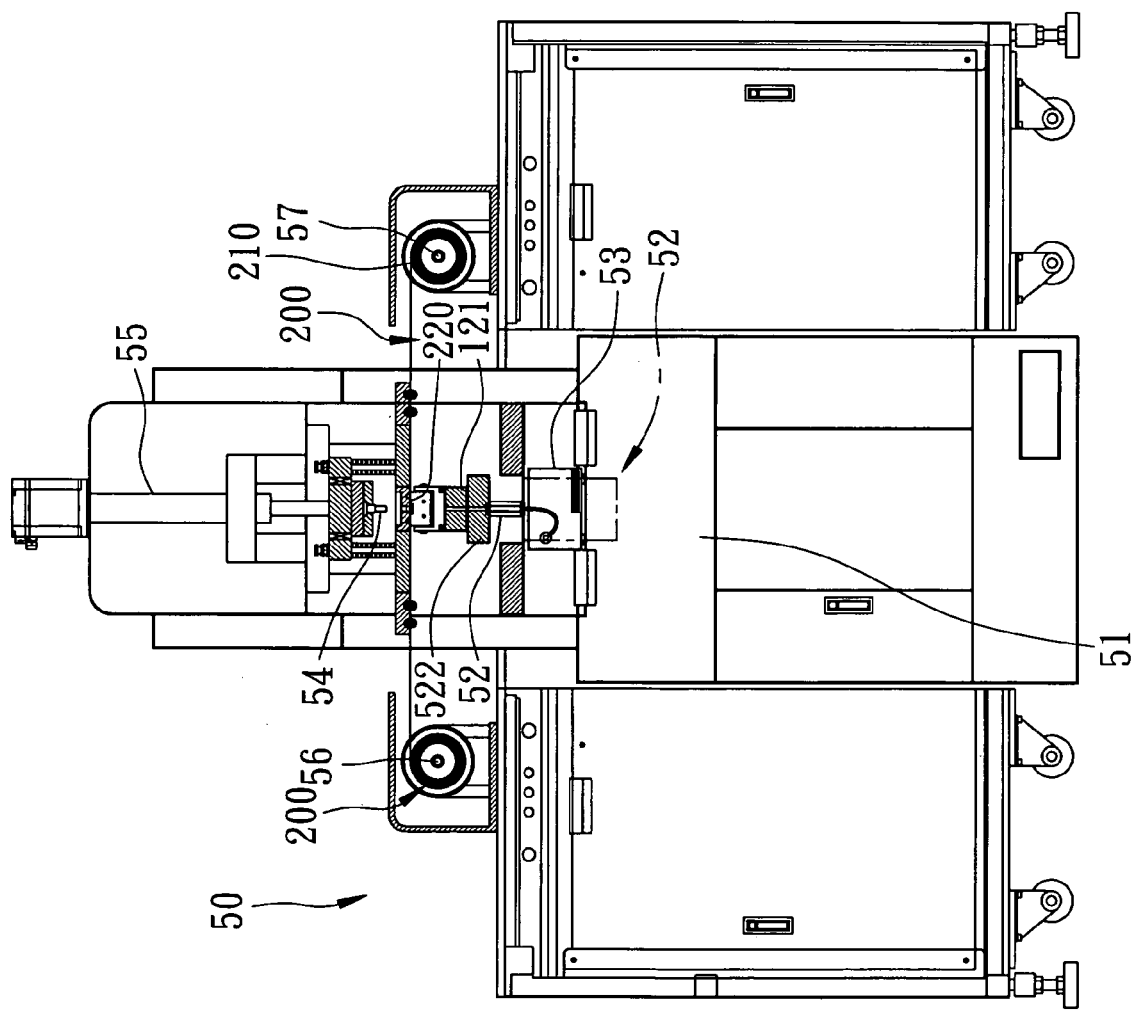
FIG. 6 is a sectional view taken along line 6-6 in FIG. 2.
Figure 7:
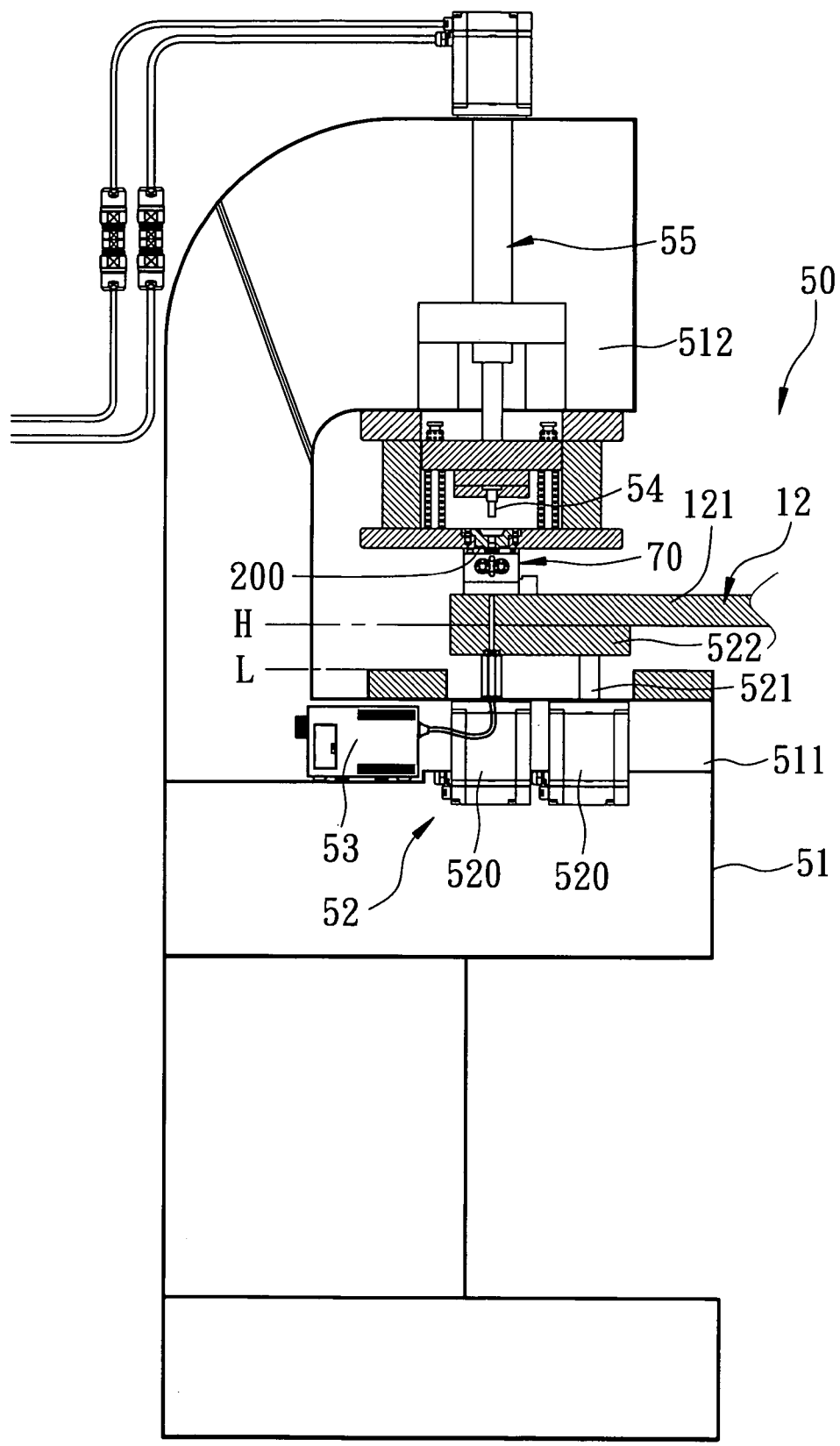
FIG. 7 is a sectional view taken along line 7-7 in FIG. 2.

With additional reference to FIGS. 6 and 7, the adhesion unit 50 is disposed at a third workstation (III) that is located behind the second workstation (II) along the feeding direction. The adhesion unit 50 includes a base 51, a supporting unit 52, an ultraviolet-irradiating unit 53, a movable unit 54, a driving unit 55, a first spool 56, and a second spool 57.

The base 51 is fixed on the machine bed 100, and has a lower base portion 511 disposed below the rotating member 12, and an upper base portion 512 disposed above the rotating member 12.

The supporting unit 52 is disposed in the base 51, and includes two pressure cylinders 520 and a support block 522 connected fixedly to upper ends of piston rods 521 of the pressure cylinders 520 and abutting against a bottom surface of the rotating member 12 for supporting the radial outer end of one of the support arms 121 thereon.

The ultraviolet-irradiating unit 53 is disposed on the base 51 so as to irradiate the transparent body 300 disposed between the upper and lower base portions 512, 511 of the base 51 with ultraviolet light.

With additional reference to FIG. 9, the movable unit 54 is disposed directly above the supporting unit 52, and is movable toward and away from the supporting unit 52. With additional reference to FIGS. 12A, 12B, 12C, 12D, 12E, 12F, 12G, and 12H, the movable unit 54 includes a movable body 540, a positioning unit consisting of two positioning posts 541, a pressing unit 542, and a cutting unit consisting of two cutters 543. The movable body 540 is disposed movably on the upper base portion 512. The positioning posts 541 are connected movably to the movable body 540, and extend downwardly from a bottom surface of the movable body 540. The positioning posts 541 are movable downwardly to press the connecting unit 210 against the corresponding transparent body 300. Each of the positioning posts 541 is formed with a positioning pin 541' extending downwardly from a bottom surface thereof. The positioning pins 541' are movable downwardly to engage respectively two of the positioning holes 230 in the band 200 so as to position the corresponding light-shielding sheet 220 relative to the supporting unit 52. The pressing unit 542 is connected movably to the movable body 540, and is disposed between the positioning posts 541. The pressing unit 542 is movable downwardly to press one of the light-shielding sheets 220 of the band 200 against the surface 310 of the corresponding transparent body 300.

Figure 11:
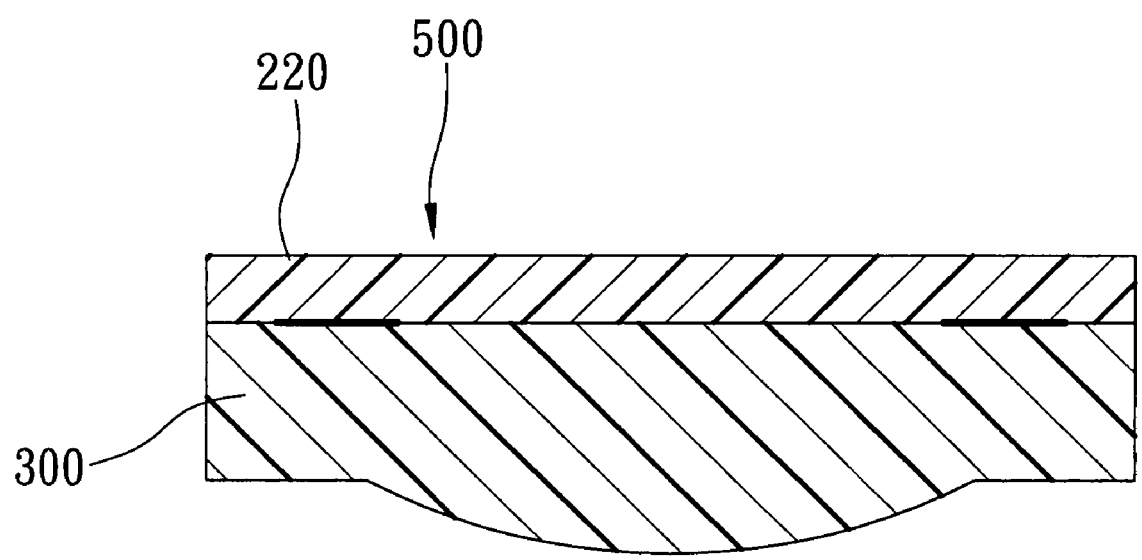
FIG. 11 is a sectional view of an optical lens unit formed from one of the light-shielding sheets and one of the transparent bodies.

When the pressing unit 542 presses the one of the light-shielding sheets 220 of the band 200 against the corresponding transparent body 300, the ultraviolet-irradiating unit 53 is operated to irradiate the glue on the corresponding transparent body 300 with ultraviolet light so as to cure the glue. As a consequence, the one of the light-shielding sheets 220 is adhered onto the corresponding transparent body 300 to form an optical lens unit 500 (see FIG. 11). Each of the cutters 543 is connected movably to the movable body 540, and is disposed between the heating unit 542 and the corresponding positioning post 541. The cutters 543 are movable downwardly to cut two corresponding ones of the sheet-connecting strips 240 of the band 200 so as to remove the one of the light-shielding sheets 220 from connecting unit 210.

The driving unit 55 is configured as a pressure cylinder, and drives the movable unit 54 to move relative to the support unit 52.

The first and second spools 56, 57 are disposed on the machine bed 100, and are located to two opposite sides of the support unit 52. The first spool 56 is adapted to permit the band 200 to be wounded thereon. The second spool 57 is adapted to permit the connecting unit 210 to be wounded thereon.

The removing unit 60 is disposed at a fourth workstation (IV) that is located behind the third workstation (III) along the feeding direction, and has a structure similar to those of the suction unit 30 and the glue-applying unit 40, as shown in FIG. 2. The removing unit 60 includes a third fixed seat 61, a horizontal fifth guide rail 62, a horizontal sixth guide rail 63, a third supporting member 64, a fifth driving member 65, and a sixth driving member 66. The third fixed seat 61 is fixed on the top surface of the machine bed 100. The fifth guide rail 62 is disposed fixedly on the third fixed seat 61, and extends along the second direction (Y) (see FIG. 2). The sixth guide rail 63 is disposed movably on the fifth guide rail 62, and extends along the first direction (X). The third supporting member 64 is disposed movably on the sixth guide rail 63. The fifth driving member 65 is operable to move the sixth guide rail 63 along the fifth guide rail 62. The sixth driving member 66 is operable to move the third supporting member 64 along the sixth guide rail 63. The removing unit 60 further includes a third driving cylinder 641, a third operating rod 642, and a third suction nozzle 643, as shown in FIG. 7. The third operating rod 642 is driven by the third driving cylinder 641 to move vertically relative to the third supporting member 64. The third suction nozzle 643 is disposed on a lower end of the third operating rod 642, and is adapted to remove one of the optical lens units 500 from the corresponding holder 70.

Each of the holders 70 is adapted to receive one of the transparent bodies 300, and is rotatable with the rotating member 12 into the first, second, third, and fourth workstations (I, II, III, IV) to align with the suction unit 30, the glue-applying unit 40, the adhesion unit 50, and the removing unit 60.

When the holders 70 are stopped respectively at the first, second, third, and fourth workstations (I, II, III, IV), the rotating member 12 is disposed at the high position (H).

When it is desired to perform an adhering operation by means of the apparatus of this invention, a plurality of receiving trays 400 filled with the transparent bodies 300 are disposed on the machine bed 100 near the suction unit 30, and a plurality of empty receiving trays 400 are disposed on the machine bed 100 near the removing unit 60.

Referring to FIGS. 2 and 3, the preferred embodiment of a method for adhering one light-shielding sheet 220 onto one transparent body 300 according to this invention includes the following steps:

(A) moving the transparent body 300 on the machine bed 100 into the holder unit by suction;

(B) moving the holder unit on the machine bed 100 in the feeding direction;

(C) cooperating with operation of the holder unit so as to apply the ultraviolet glue to the transparent body 300;

(D) cooperating with operation of the holder unit so as to move the transparent body 300 on the machine bed 100 to a position under the light-shielding sheet 220;

(E) pressing the light-shielding sheet 220 against the transparent body 300 so as to adhere the light-shielding sheet 220 onto the transparent body 300, thereby forming one optical lens unit 500; and (F) removing the optical lens unit 500 from the holder unit.

In the step (A), the first and second driving members 34, 341 are operated so as to move and align the first supporting member 33 with the transparent body 300 to be adhered. Subsequently, the first operating rod 332 can be moved downwardly by the first driving cylinder 331 so as to permit the first suction nozzle 333 to attach to the transparent body 300. The first driving cylinder 331 again drives the first operating rod 332 and the attached transparent body 300 to move upwardly. The first and second driving members 34, 341 are operated again to move the transparent body 300 to a position directly above the holder 70 at the first workstation (I). At this time, the first driving member 331 drives the first operating rod 332 to move downwardly to allow for placement of the transparent body 300 into the holder 70.

In the step (B), the rotating member 12 is rotated by 90° along the feeding direction to move the holder 70 from the first workstation (I) into the second workstation (II).

In the step (C), after the rotating member 12 has arrived at the high position (H) in the second workstation (II), the third driving member 45 moves the fourth guide rail 43 on the third guide rail 42 along the second direction (Y), and the fourth driving member 46 moves the second supporting member 44 on the fourth guide rail 43 along the first direction (X) so as to move the glue-applying member 443 to a glue-feeding position directly above the transparent body 300 disposed within the holder 70. In the glue-feeding position, the glue-applying member 443 applies the glue to the surface 310 of the transparent body 300 at a plurality of positions.

In the step (D), the rotating member 12 is rotated by 90° once again to move the holder 70 from the second workstation (II) into the third workstation (III). As such, the holder 70 is moved to the position under the light-shielding sheet 220.

Figure 12A:
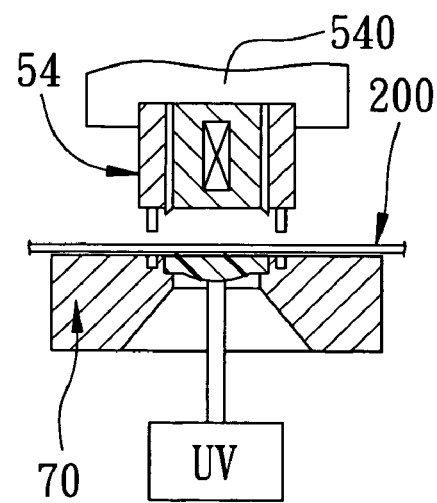
FIGS. 12A, 12B, 12C, 12D, 12E, 12F, 12G, and 12H are schematic views illustrating operation of the adhesion unit of the preferred embodiment.
Figure 12B:
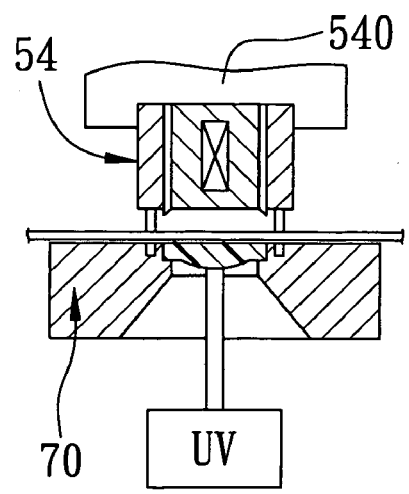
Figure 12C:
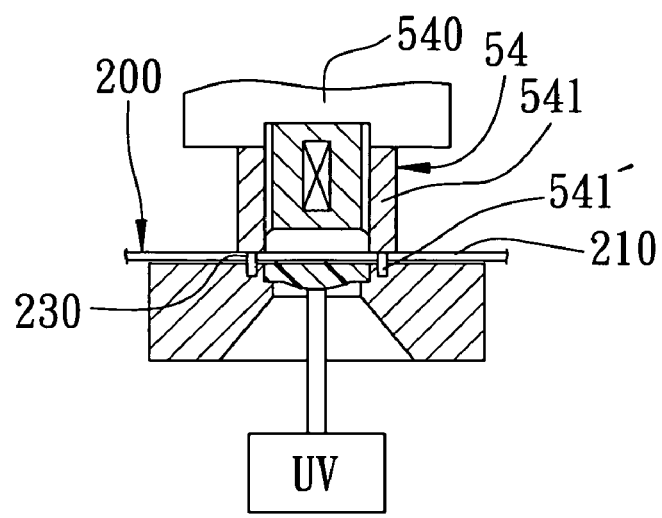
Figure 12D:
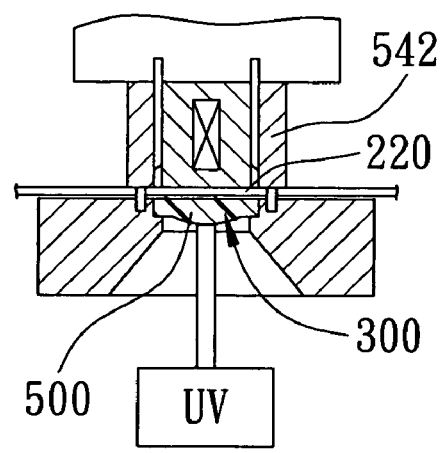
Figure 12E:
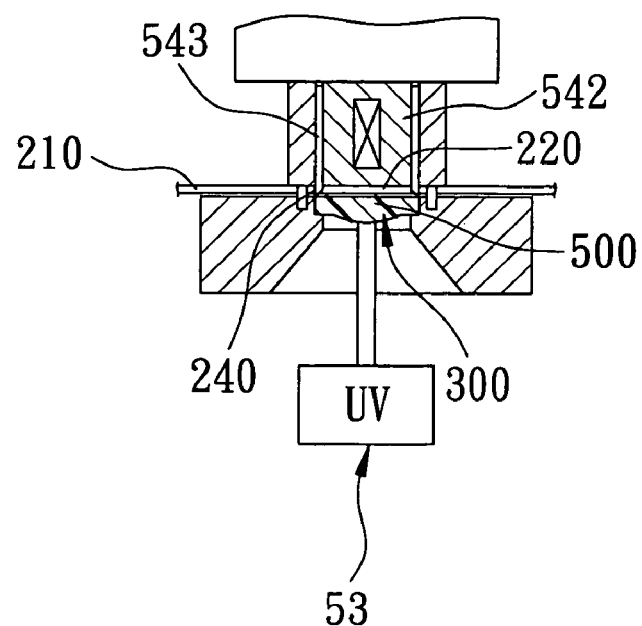
Figure 12F:
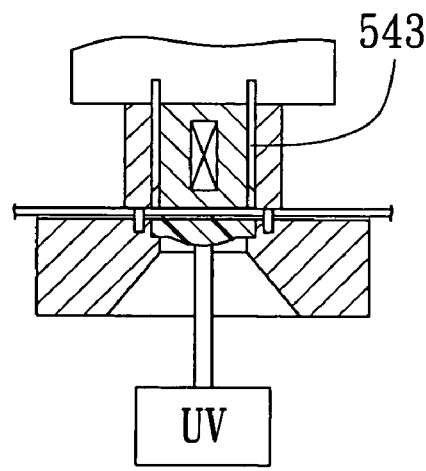
Figure 12G:
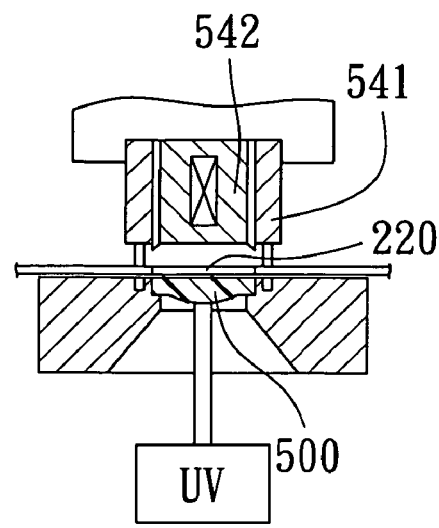

With additional reference to FIGS. 6, 7, 12A, 12B, 12C, 12D, 12E, 12F, 12G, the step (E) includes the substeps:

(E1) moving the support block 522 upwardly by the pressure cylinders 520 to abut against the supporting arm 121 extending into the base 51 of the adhesion unit 50, and simultaneously moving the positioning posts 541 of the movable unit 54 downwardly so as to press the light-shielding sheet 220 against the transparent body 300 and so as to engage respectively the positioning pins 541' of the movable unit 54 with a plurality of the positioning holes 230 in the band 200, thereby positioning the light-shielding sheet 220 on the machine bed 100, as shown in FIG. 12C;

(E2) moving the pressing unit 542 of the movable unit 54 downwardly so as to press the light-shielding sheet 220 against the transparent body 300, and simultaneously irradiating the glue on the surface 310 of the transparent body 300 with ultraviolet light so as to cure the glue, thereby attaching the light-shielding sheet 220 onto the transparent body 300, as shown in FIG. 12D;

(E3) moving the cutters 543 of the movable unit 54 downwardly so as to cut the band 200 at junctures between the light-shielding sheet 220 and the remaining portion of the band 200, i.e., two sheet-connecting strips 240 flanking the light-shielding sheet 220, thereby removing the light-shielding sheet 220 from the remaining portion of the band 200, as shown in FIG. 12E, to form the optical lens unit 500;

(E4) retracting the cutters 543 into the moving unit 54, as shown in FIG. 12F; and (E5) removing the positioning posts 541 and the pressing unit 542 from the light-shielding sheet 220, as shown in FIG. 12G.

Figure 12H:
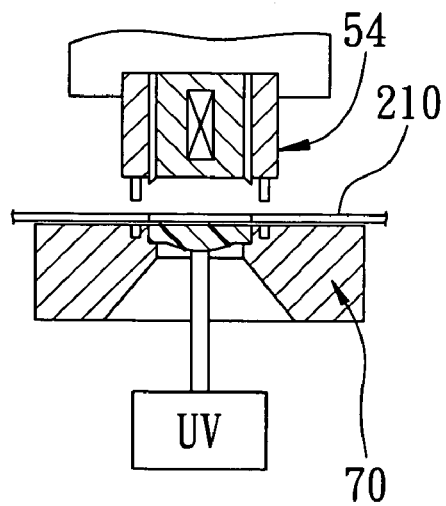

When the movable unit 54 moves upwardly away from the connecting unit 210 to an upper limit position shown in FIG. 12H, the first and second spools 56, 57 are rotated so as to move the next light-shielding sheet 220 to a position under the movable unit 54, thereby allowing for a subsequent adhering operation.

In the step (F), the rotating member 12 is rotated by 90° one more time to move the holder 70 loaded with the optical lens unit 500 from the third workstation (III) into the fourth workstation (IV). Because the third operating rod 642 can be moved vertically by means of the third driving cylinder 641, and because the third supporting member 64 can be moved on the fifth and sixth guide rails 62, 63 along the first and second directions (X, Y), the optical lens unit 500 can be attached to and moved by the suction nozzle 643 from the holder 70 onto one receiving tray 400 disposed in proximity to the removing unit 60.

During each interval of intermittent rotation of the rotating unit 10, each of the holders 70 is moved on the machine bed 100 from the low position to the high position, and subsequently from the high position to the low position.

The method of this invention has the following advantages:

(1) Since the light-shielding sheets 220 are connected integrally to the connecting unit 210 of the band 200, and since the band 200 is wound on the first spool 56, stock-taking and material management of the light-shielding sheets 220 can be easily performed.

Figure 1:
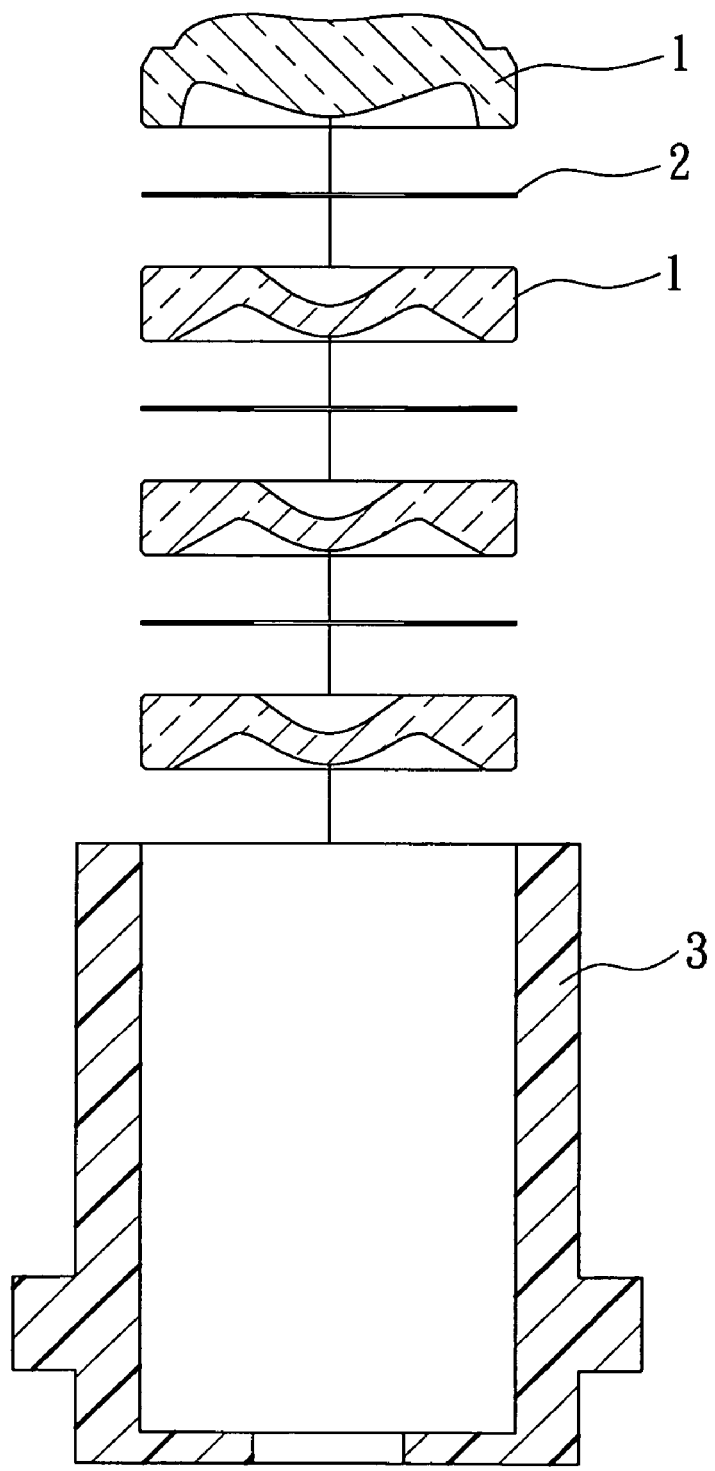
FIG. 1 is an exploded sectional view of a conventional optical instrument.

(2) Since the light-shielding sheets 220 are cut to separate from the connecting unit 210 of the band 200 after they are adhered respectively onto the transparent bodies 300, the disadvantages associated with the assembly process of the conventional optical lens unit of FIG. 1, including difficulties in moving the light-shielding sheets 220 by suction, and including formation of fingerprints or traces of a suction device on surfaces of the light-shielding sheets 220, are eliminated.

(3) The apparatus is a fully automatic machine. Thus, the quality of the optical lens units 500 can be enhanced. Furthermore, the rate of which the light-shielding sheets 220 are adhered to the transparent bodies 300 is increased.

With this invention thus explained, it is apparent that numerous modifications and variations can be made without departing from the scope and spirit of this invention. It is therefore intended that this invention be limited only as indicated by the appended claims.

We claim:

1. A method for adhering a light-shielding sheet onto a transparent body, comprising the steps of:
   (A) moving said transparent body into a holder unit by suction;
   (B) moving said holder unit in a feeding direction;
   (C) cooperating with operation of said holder unit so as to apply glue to said transparent body;
   (D) cooperating with operation of said holder unit so as to move said transparent body to a position under said light-shielding sheet; and
   (E) pressing said light-shielding sheet against said transparent body so as to adhere said light-shielding sheet onto said transparent body, thereby forming an optical lens unit.

2. The method as claimed in claim 1, further comprising a step (F), after the step (E), of removing said optical lens unit from said holder unit.

3. The method as claimed in claim 2, wherein the step (A) includes moving said transparent body into one of a plurality of equidistant holders of said holder unit by suction, which are disposed on a rotating unit, and the step (B) includes intermittently rotating said rotating unit and, thus, said holders in said feeding direction.

4. The method as claimed in claim 3, wherein the glue is ultraviolet glue, and the step (E) includes curing the glue by irradiation of ultraviolet light.

5. The method as claimed in claim 4, wherein the step (E) includes the substeps:
   (E1) engaging respectively a plurality of positioning pins of an adhesion unit with a plurality of positioning holes in a unitary band including said light-shielding sheet, thereby positioning said light-shielding sheet;
   (E2) moving a pressing unit of a movable unit of said adhesion unit so as to press said light-shielding sheet against said transparent body;
   (E3) irradiating said glue with ultraviolet light so as to cure said glue, thereby attaching said light-shielding sheet to said transparent body; and
   (E4) moving a cutting unit of said adhesion unit toward said transparent body so as to cut said band at junctures between said light-shielding sheet and the remaining portion of said band, thereby removing said light-shielding sheet from the remaining portion of said band.

6. The method as claimed in claim 3, wherein the step (B) includes operating a cam unit to move each of said holders from a low position to a high position, and subsequently from said high position to said low position during each interval of intermittent rotation of said rotating unit.

7. An apparatus for adhering respectively a plurality of light-shielding sheets of a band onto a plurality of transparent bodies, the band further having a connecting unit connected integrally to the light-shielding sheets such that said light-shielding sheets are arranged along a longitudinal direction of said band, said apparatus comprising:

an adhesion unit including
- a base,
- a supporting unit disposed on said base,
- an ultraviolet-irradiating unit disposed on said base and adapted to irradiate the transparent bodies individually with ultraviolet light so as to cure an ultraviolet glue applied on the transparent body,
- a movable unit disposed directly above said supporting unit and movable toward and away from said supporting unit, the moving unit including a positioning unit adapted to be moved to engage the band so as to position one of the light-shielding sheets relative to said supporting unit, a pressing unit adapted to be moved to press the one of the light-shielding sheets against a corresponding one of the transparent bodies so as to adhere the one of the light-shielding sheets onto the corresponding one of the transparent bodies to thereby form an optical lens unit, and a cutting unit adapted to be moved to cut the band so as to remove the one of the light-shielding sheets from the remaining portion of the band, and
- a driving unit for moving said movable unit relative to said supporting unit; and a plurality of holders, each of which is adapted to receive one of the transparent bodies and is movable onto said supporting unit of said adhesion unit.

8. The apparatus as claimed in claim 7, wherein said adhesive unit further includes a pair of first and second spools located to two sides of said supporting unit of said adhesive unit, said first spool being adapted to permit the band to be wounded thereon, said second spool being adapted to permit the connecting unit of the band to be wounded thereon.

9. The apparatus as claimed in claim 8, further comprising:
- a machine bed, said base of said adhesive unit being fixed on said machine bed, said first and second spools being disposed on said machine bed;
- a rotating unit including a bottom seat movable vertically within said machine bed, and a rotating member rotatable on said bottom seat in a feeding direction, said holders being disposed fixedly on said rotating member; and
- a cam unit for moving said bottom seat of said rotating unit and, thus, each of said holders intermittently and vertically between a high position and a low position.

10. The apparatus as claimed in claim 9, further comprising a suction unit that is disposed in front of said adhesive unit along said feeding direction and that includes:
- a first fixed seat fixed on said machine bed;
- a horizontal first guide rail disposed fixedly on said first fixed seat and extending along a first direction;
- a horizontal second guide rail disposed movably on said first guide rail and extending along a second direction perpendicular to said first direction;
- a first supporting member disposed movably on said second guide rail;
- a first driving member operable to move said second guide rail along said first guide rail;
- a second driving member operable to move said first supporting member along said second guide rail;
- a first operating rod disposed movably on said first supporting member;
- a first driving cylinder for driving said first operating rod to move vertically relative to said first supporting member; and
- a first suction nozzle disposed on an end of said first operating rod and adapted to move one of the transparent bodies into a corresponding one of said holders.

11. The apparatus as claimed in claim 10, further comprising a glue-applying unit that is disposed between said suction unit and said adhesion unit along said feeding direction and that includes:
- a second fixed seat fixed on said machine bed;
- a horizontal third guide rail disposed fixedly on said second fixed seat and extending along said second direction;
- a horizontal fourth guide rail disposed movably on said third guide rail and extending along said first direction;
- a second supporting member disposed movably on said fourth guide rail;
- a third driving member operable to move said fourth guide rail along said third guide rail;
- a fourth driving member operable to move said second supporting member along said fourth guide rail;
- a second operating rod disposed movably on said second supporting member;
- a second driving cylinder for driving said second operating rod to move vertically relative to said second supporting member; and
- a glue-applying member disposed on an end of said second operating rod and adapted to apply the ultraviolet glue to one of the transparent bodies.

12. The apparatus as claimed in claim 11, further comprising a removing unit that is disposed behind said adhesion unit along said feeding direction and that includes:
- a third fixed seat fixed on said machine bed;
- a horizontal fifth guide rail disposed fixedly on said third fixed seat and extending along said second direction;
- a horizontal sixth guide rail disposed movably on said fifth guide rail and extending along said first direction;
- a third supporting member disposed movably on said sixth guide rail;
- a fifth driving member operable to move said sixth guide rail along said fifth guide rail;
- a sixth driving member operable to move said third supporting member along said sixth guide rail;
- a third operating rod disposed movably on said third supporting member;
- a third driving cylinder for driving said third operating rod to move vertically relative to said third supporting member; and
- a third suction nozzle disposed on an end of said third operating rod and adapted to remove said optical lens unit from the corresponding one of said holders.

13. The apparatus as claimed in claim 9, wherein said rotating member has a bottom surface, said supporting unit of said adhesion unit including at least one pressure cylinder and abutting against said bottom surface of said rotating member.

* * * * *